(12) United States Patent
Samie et al.

(10) Patent No.: US 8,087,502 B2
(45) Date of Patent: Jan. 3, 2012

(54) ACTUATOR FOR SHIFTING A SELECTABLE ONE-WAY CLUTCH

(75) Inventors: Fazad Samie, Franklin, MI (US);
Andrew L. Bartos, Clarkston, MI (US);
Gary L. Jones, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 492 days.

(21) Appl. No.: 12/416,987

(22) Filed: Apr. 2, 2009

(65) Prior Publication Data

US 2010/0255954 A1 Oct. 7, 2010

(51) Int. Cl.
*F16D 41/00* (2006.01)
*F16D 25/08* (2006.01)

(52) U.S. Cl. ... 192/47; 192/43.1; 192/85.48; 192/85.59; 92/130 D

(58) Field of Classification Search ............ 192/47, 192/85.48, 85.59; 92/130 D, 131
See application file for complete search history.

(56) References Cited

U.S. PATENT DOCUMENTS

| | | | | |
|---|---|---|---|---|
| 4,125,059 A | * | 11/1978 | Tuji | 92/51 |
| 6,905,009 B2 | * | 6/2005 | Reed et al. | 192/43.1 |
| 7,198,587 B2 | * | 4/2007 | Samie et al. | 475/285 |
| 7,721,860 B2 | * | 5/2010 | Saka | 192/43.1 |

* cited by examiner

*Primary Examiner* — Richard M. Lorence
(74) *Attorney, Agent, or Firm* — Quinn Law Group, PLLC

(57) ABSTRACT

An actuator shifts a selectable one-way clutch (SOWC) between a plurality of operating modes. A first spring has a preload compression that is equivalent to a first start pressure. A second spring, disposed adjacent to the first spring, has a preload compression that is equivalent to a second start pressure. A plunger movably contacts the first spring and a slide plate movably extends from the plunger. The slide plate engages the SOWC such that the SOWC shifts between the operating modes in response to movement of the slide plate. The first spring is compressible from beyond the preload compression to a first stop position as the pressure is increased from the first start pressure to a first stop pressure. The second spring is compressible from beyond the respective preload compression to a second stop position as the pressure is increased from the second start pressure to a second stop pressure.

20 Claims, 2 Drawing Sheets

ACTUATOR FOR SHIFTING A SELECTABLE ONE-WAY CLUTCH

TECHNICAL FIELD

The present invention relates to an actuator for selectively moving a clutch into a desired operating mode.

BACKGROUND OF THE INVENTION

A typical selectable one-way clutch (SOWC) is designed to have only two modes of operation; namely, a forward mode, wherein the input race is free to rotate with respect to the output race, and reverse mode, wherein the input race is mechanically locked to the output race in at least one direction of rotation. SOWC's are used in automatic transmissions to facilitate shifting from forward to reverse, replacing both a one-way clutch and a plate clutch. A forward/reverse selection mechanism for these types of SOWC's is typically either hydraulically or electrically controlled. In these types of SOWC's, movement of a slide plate or ring in the SOWC controls strut movement to lock and unlock an input race with respect to an output race. Normally, when the slide plate covers the reverse struts, the SOWC is in the forward mode, which is commonly the default mode.

Other SOWC's have provided three modes of operation that include a neutral mode, in addition to forward and reverse modes. In these SOWC's, the forward and reverse struts may be separate or they may be integrated into a single strut. When a reverse strut or a reverse portion of the single strut is covered by the slide plate, the SOWC transmits torque, or "holds", in the forward direction of rotation and freewheels in the opposite, or reverse direction. When a forward strut or a forward portion of the single strut is covered by the slide plate, the SOWC transmits torque, or "holds" in the reverse direction of rotation and freewheels in the opposite, or forward direction. A plurality of actuators is typically used to move the slide plate between the desired positions.

SUMMARY OF THE INVENTION

An actuator is configured for shifting a selectable one-way clutch (SOWC) between a plurality of operating modes. The actuator includes a first spring configured for being compressed along a first axis. The first spring has a preload compression along the first axis that is equivalent to a first start pressure. A second spring is disposed adjacent the first spring and is configured for being compressed along the first axis. The second spring has a preload compression along the first axis that is equivalent to a second start pressure. A plunger is movably disposed along the first axis such that the first spring is disposed between the plunger and the second spring. A slide plate movably extends from the plunger and is configured for operatively engaging the SOWC such that the SOWC shifts between the plurality of operating modes in response to movement of the plunger and the slide plate. The first spring is configured for being compressed from beyond the preload compression to a first stop position as the pressure is increased from the first start pressure to a first stop pressure such that the first spring is prevented from further compression along the first axis. The second spring is configured for being compressed from beyond the respective preload compression to a second stop position as the pressure is increased from the second start pressure to a second stop pressure such that the second spring is prevented from further compression along the first axis.

A method of operating an actuator that is configured to shift a selectable one-way clutch (SOWC) between a plurality of operating modes includes providing a first spring and a second spring. The second spring is disposed along a first axis, adjacent the first spring. A plunger is provided such that the first spring is disposed between the plunger and the second spring. A slide plate is provided that operatively extends from the plunger and is configured for operative connection to the SOWC. A preload compression is applied to the first spring along the first axis, wherein the preload compression is equivalent to a first start pressure. A preload compression is applied to the second spring along the first axis, wherein the preload compression is equivalent to a second start pressure. A pressure related force, herein called simply a pressure, is applied to the slide plate that is greater than the first start pressure such that the slide plate and the plunger move to further compress the first spring along the first axis from the preload compression. The pressure applied to the slide plate is increased from the first start pressure to a first stop pressure such that the slide plate and the plunger move to further compress the first spring until a first stop position is reached. The first stop position corresponds to a second operating mode of the SOWC. The pressure applied to the slide plate is increased from the first stop pressure to a second start pressure, wherein the slide plate and the plunger remain stationary to maintain the second operating mode of the SOWC. The pressure applied to the slide plate is increased from the second start pressure to a second stop pressure such that the slide plate and the plunger move to further compress the second spring from the preload compression until a second stop is reached. The second stop position corresponds to a third operating mode of the SOWC.

In another aspect of the invention, a clutch assembly is configured for shifting between a plurality of operating modes. The clutch assembly includes a selectable one-way clutch assembly (SOWC) and an actuator. The SOWC is movable between a first operating mode, a second operating mode, and a third operating mode. The actuator is configured to shift the SOWC between the operating modes. The actuator includes a spring housing that defines a first bore therein. A first spring is disposed in the first bore and is configured for being compressed along a first axis. The first spring has a preload compression along the first axis that is equivalent to a first start pressure. A second spring is disposed in the second bore, adjacent the first spring, and is configured for being compressed along the first axis. The second spring has a preload compression along the first axis that is equivalent to a second start pressure. A plunger is movably disposed in the first bore along the first axis such that the first spring is disposed between the plunger and the second spring. A slide plate movably extends from the plunger and is configured to operatively engage the SOWC such that the SOWC shifts between the plurality of operating modes in response to movement of the plunger and the slide plate. The first spring is configured for being compressed from beyond the preload compression to a first stop position as the pressure is increased from the first start pressure to a first stop pressure such that the first spring is prevented from further compression along the first axis. The second spring is configured for being compressed from beyond the respective preload compression to a second stop position as the pressure is increased from the second start pressure to a second stop pressure such that the second spring is prevented from further compression along the first axis.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
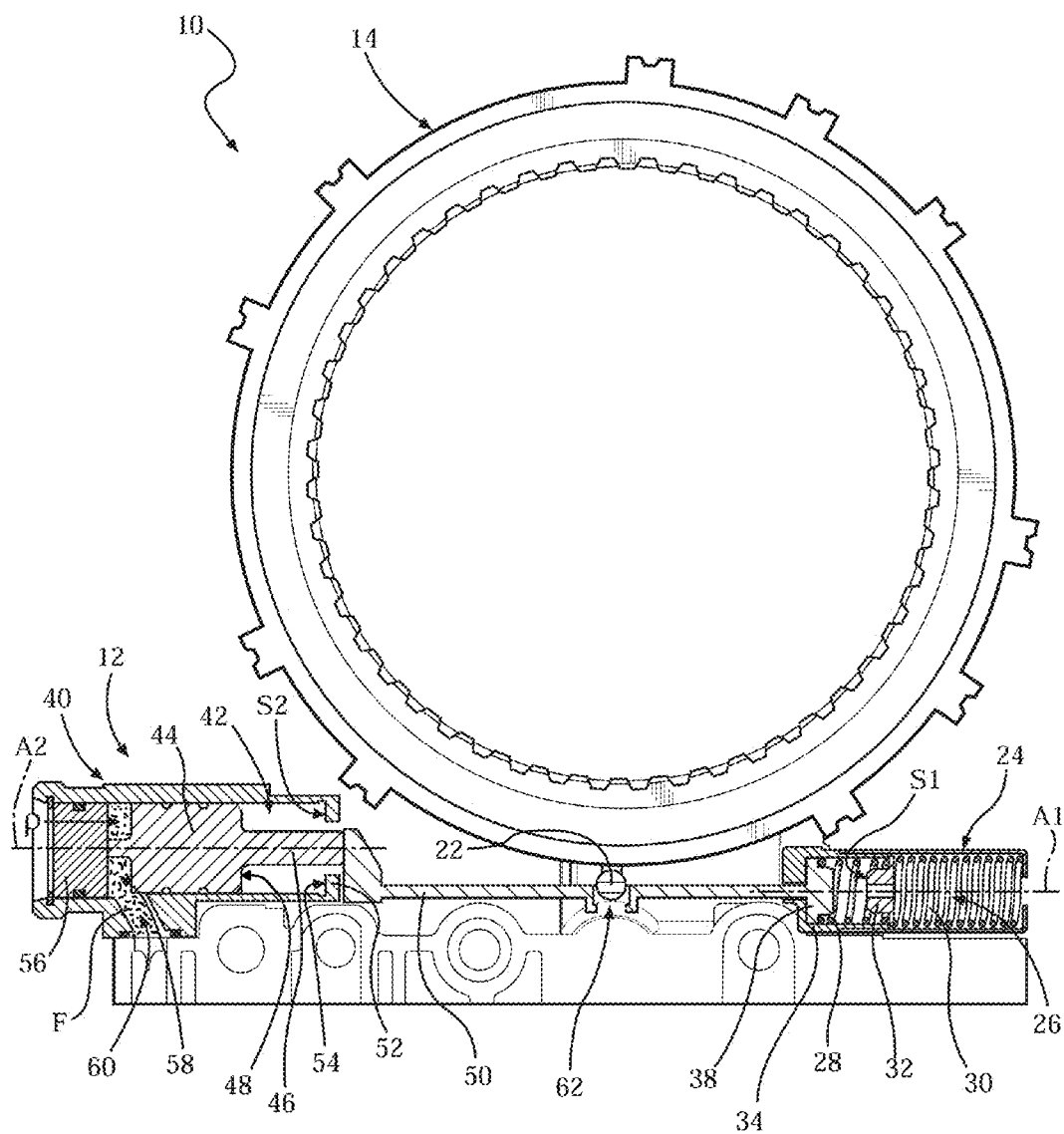
FIG. 1 is a schematic partial cross sectional side view of an actuator operatively attached to a selectable one-way clutch (SOWC)
Figure 2:
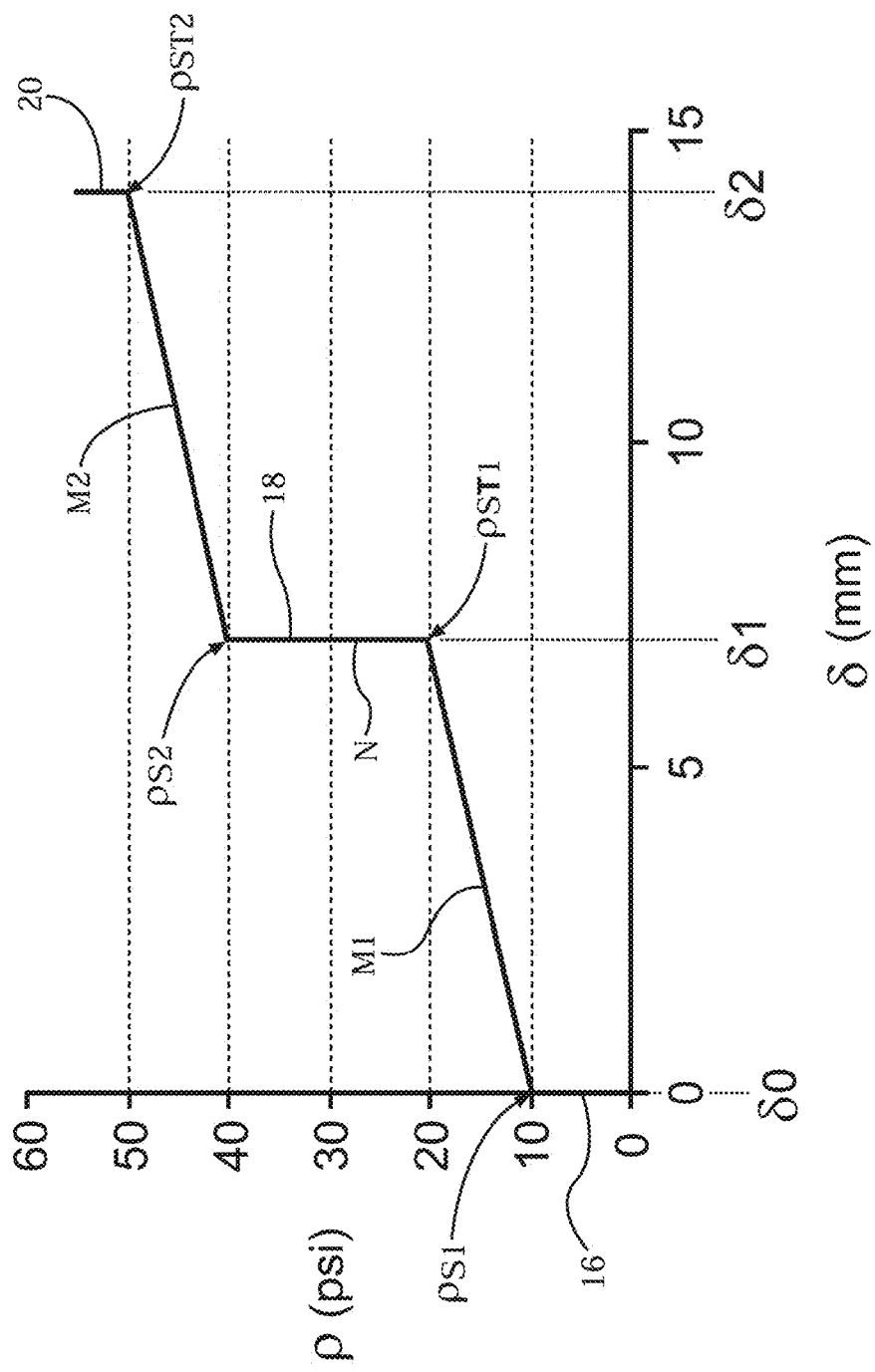
FIG. 2 is a graphical representation of the actuator shifting the SOWC between a plurality of modes in response to the application of a pressure.

Referring to the drawings, wherein like reference numbers refer to like components, FIG. 1 shows a clutch assembly 10 including an actuator 12 operatively connected to a selectable one-way clutch (SOWC 14). The actuator 12 is configured for shifting the SOWC 14 to one of a plurality of operating modes, i.e., a first mode 16, a second mode 18, and a third mode 20, as shown in FIG. 2. For purposes of illustration, the operating modes may be a forward mode, i.e., a first mode 16, a neutral or freewheel mode, i.e., the second mode 18, and a reverse mode, i.e., 20. It should be appreciated that more or less modes of operation may be used as known to those skilled in the art. The neutral mode may be immediately after the forward mode and the reverse mode may be immediately after the neutral mode. It should be appreciated that the modes may be in any other order known to those skilled in the art.

Referring to FIG. 1, the SOWC 14 includes a shift lever or a fork 22 that is operatively engaged with the actuator 12. The shift lever or fork 22 moves or rotates to shift the SOWC 14 between the operating modes in response to operation of the actuator 12. The actuator 12 operates in response to an application of a pressure force ρ, hereinafter referred to as a pressure ρ, as shown in FIG. 2. However, it should be appreciated that the invention is not limited to using pressure ρ, as the actuator 12 may also operate in response to the application of a voltage or any other pressure ρ known to those skilled in the art.

The actuator 12 includes a spring housing 24 defining a first bore 26 therein. A first spring 28 and a second spring 30 are disposed in the first bore 26, extending along a first axis A1. The second spring 30 is disposed adjacent the first spring 28 along the first axis A1. Each spring is compressible along the first axis A1. The first spring 28 has a first spring constant and the second spring 30 has a second spring constant, different from the first spring constant. A washer 32 is operatively disposed between the first spring 28 and the second spring 30 such that the washer 32 applies a preload compression to the second spring 30 along the first axis A1. This means that the washer 32 partially compresses the second spring 30 along the first axis A1 when no pressure ρ is applied to the actuator 12. Referring to FIG. 1, a sleeve 34 operatively extends into a portion of the first bore 26 to bias the washer 32 toward the second spring 30 such that the washer 32 applies a preload compression to the second spring 30, i.e., partially compresses the second spring 30. The washer 32 is movable within the first bore 26 along the first axis A1 toward the second spring 30 to further compress the second spring 30 from beyond the initial preload compression, as will be described in further detail below. Likewise, the sleeve 34 provides a stop to limit travel of the washer 32 away from the second spring 30 within the first bore 26 when no pressure ρ is applied to the actuator 12, while the washer 32 maintains the second spring 30 in the preload compression.

A plunger 38 is movably disposed in the first bore 26 along the first axis A1. The first spring 28 is disposed between the plunger 38 and the washer 32 along the first axis A1 such that the plunger 38 applies a preload compression to the first spring 28 along the first axis A1. This means that the plunger 38 partially compresses the first spring 28 along the first axis A1 between the plunger 38 and the washer 32. The plunger 38 is movable along the first axis A1 to compress the first spring 28 until the plunger 38 contacts the washer 32, which acts as a first stop position S1. Likewise, the sleeve 34 provides a stop to limit travel of the plunger 38 away from the first spring 28 within the first bore 26 when no pressure ρ is applied to the actuator 12, while the plunger 38 maintains the first spring 28 in the preload compression.

A piston housing 40 defines a second bore 42 therein. A piston 44 is slidably disposed in the second bore 42 and movable along a second axis A2. The piston 44 presents a piston face 48 and a finger 46 may extend from the piston face 48. The finger 46 is configured to contact and move a slide plate 50. The slide plate 50, which is operatively connected to the shift lever or fork 22, in turn, translates motion of the piston 44 into movement of the shift lever or fork 22 to shift the SOWC 14 between the operating modes 16, 18, 20. The slide plate 50 extends from, or otherwise contacts, the plunger 38 such that the slide plate 50 and plunger 38 are biased by the spring constants and the preload compressions of one or both of the springs 28, 30 within the spring housing 24.

The piston housing 40 includes a collar 52 that at least partially surrounds the finger 46. The collar 52 presents a bottom surface 54 that is configured to act as a second stop position S2 to limit travel of the piston 44 within the second bore 42 as the piston 44 moves along the second axis A2 within the second bore 42. The piston housing 40 also includes a cover 56 disposed in opposition to the collar 52. A pressure chamber 58 is defined between the piston 44 and the cover 56 within the piston housing 40. A pressure inlet 60 extends between the pressure chamber 58 and a pump (not shown). The pump may be in operative communication with a transmission controller (not shown). The pump supplies a fluid F into the pressure chamber 58 to move the piston 44 and the slide plate 50. The pump supplies the fluid F to the pressure chamber 58 at a pressure ρ that is indicated by the transmission controller. In the absence of a signal from the transmission controller, the pump may provide no fluid F to the pressure chamber 58. In the embodiment shown in FIG. 2, the pressure ρ provided by the pump may range from 0 psi of pressure ρ to at least 50 psi of pressure ρ. However, it should be appreciated that other pressures ρ may be provided by the pump as known to those skilled in the art.

As the slide plate 50 moves the plunger 38 toward the first spring 28 and the washer 32, the first spring 28 is further compressed from the initial preload compression. As described above, the slide plate 50 is configured for operative engagement with the shift lever or fork 22 of the SOWC 14. The slide plate 50 may define a slot 62 and a portion of the shift lever or fork 22 extends into the slot 62. However, it should be appreciated that other configurations for operative engagement between the slide plate 50 and the shift lever or fork 22 may be used ask known to those skilled in the art. The shift lever or fork 22 moves the SOWC 14 between the modes 16, 18, 20 in response to movement of the slide plate 50. The finger 46 of the piston 44 biases and moves the slide plate 50 and the plunger 38 toward the springs 28, 30 in response to the application of the pressure ρ to the piston 44. Referring to FIG. 2, in the forward mode 16, when no pressure ρ is applied to the piston 44, the actuator 12 plate and the plunger 38 are biased by the springs 28, 30 such that the SOWC 14 remains in the forward mode 16.

The preload compression of the first spring 28 may be equivalent to the application of a first start pressure ρS1 to the piston 44. Referring to FIG. 2, the first start pressure ρS1 is 10 psi. Therefore, the piston 44, the slide plate 50, and the plunger 38 react against the preload compression of the first spring 28. As a result of the preload compression on the first spring 28, displacement of the piston 44, the slide plate 50, and the plunger 38 along the first axis A1 toward the springs 28, 30 will be a distance of 0 mm, i.e., no movement, until the pressure ρ applied to the piston 44 exceeds the first start pressure ρS1. This corresponds to 10 psi of pressure ρ, as indicated at 60 in FIG. 2. It should be appreciated that the preload applied to the first spring 28 may be equivalent to more or less than 10 psi of pressure ρ as known to those skilled in the art. Once the pressure ρ applied to the piston 44 exceeds the first start pressure ρS1, the first spring 28 begins to compress beyond the preload compression, as indicated at M1 in FIG. 2. Therefore, the preload compression of the first spring 28 is overcome when the pressure ρ applied to the piston 44 exceeds the first start pressure ρS1. As the pressure ρ applied to the piston 44 is increased from the first start pressure ρS1, the first spring 28 compresses from beyond the preload compression until the first stop position S1 is reached at a first stop pressure ρST1. Referring to FIG. 2, the first stop pressure ρST1 may be 20 psi of pressure ρ. As the first stop position S1 is achieved, the piston 44, the slide plate 50, and the plunger 38 have been displaced a first distance beyond the position of the preload compression of the first spring 28, as indicated at δ1 in FIG. 2. Displacement of the slide plate 50 translates into movement of the shift lever or fork 22 to shift the SOWC 14 from the forward mode 16, to the neutral mode 18, corresponding to the first stop position S1. The neutral mode 18, is achieved when the first spring 28 is fully compressed and the plunger 38 contacts the washer 32 such that the displacement of the piston 44, the slide plate 50, and the plunger 38 stops.

Once the neutral mode 18, is achieved, the pressure ρ within the pressure chamber 58 may continue to increase without allowing further displacement of the piston 44, the slide plate 50, and the plunger 38, as indicated at N in FIG. 2. In the embodiment shown in FIG. 2, the pressure ρ within the pressure chamber 58 is between 20 psi and 40 psi while still maintaining the neutral mode 18. This pressure ρ range is achieved because the preload compression of the second spring 30 is set to a second start pressure ρS2 of 40 psi of pressure ρ. Therefore, the second spring 30 will react against the plunger 38, the slide plate 50, and the piston 44 and the second spring 30 will not be further compressed beyond the preload until pressure ρ applied to the piston 44 is greater than the second start pressure ρS2, i.e., 40 psi of pressure ρ. This means that the preload compression on the second spring 30 prevents the slide plate 50, the plunger 38, and the piston 44 from further displacement until the pressure ρ applied to the piston 44 is at least equal to 40 psi of pressure ρ.

Once the pressure ρ applied to the piston 44 exceeds the second start pressure ρS2, the second spring 30 begins to compress beyond the preload compression, as indicated at M2 in FIG. 2. As the second spring 30 begins to compress, the piston 44, the slide plate 50, and the plunger 38 also begin to be displaced. Therefore, as the slide plate 50 moves, the shift lever or fork 22 also move to shift the SOWC 14 from the neutral mode 18 to the reverse mode 20. The preload compression applied to the second spring 30 is such that the second spring 30 will not begin to compress along the first axis A1 from the initial preload compression until the pressure ρ is greater than the second start pressure ρS2. Referring to FIG. 2, the second start pressure ρS2 is 40 psi of pressure ρ. However, other second start pressures ρS2 may be used as known to those skilled in the art. The pressure ρ applied to the piston 44 may continue to increase from the second start pressure ρS2 to the second stop pressure ρST2 such that the slide plate 50 is also displaced a second distance as indicated at δ2 in FIG. 2. Therefore, once the pressure ρ applied to the piston 44 reaches the second stop pressure ρST2, the piston 44 bottoms out on the bottom surface 54 of the collar 52, i.e., the second stop position S2, as the reverse mode 20 is achieved. Once the piston 44 is bottomed out on the bottom surface 54 of the collar 52, the piston 44 is prevented from further movement along the second axis A2 as pressure ρ may continue to increase in the pressure chamber 58 beyond 50 psi of pressure ρ. The second stop pressure ρST2 may be 50 psi of pressure ρ. However, other second stop pressures ρST2 known to those skilled in the art may also be used.

Likewise, in the absence of the application of the pressure ρ to the piston 44, one or both of the springs 28, 30 may bias and move the plunger 38 and the slide plate 50 toward the piston housing 40 by virtue of the respective spring constants. As a result, the lever arm or fork may move to shift the SOWC 14 from the neutral mode 18 or the reverse mode 20 to the forward mode 16. Similarly, a finite reduction in the application of the pressure ρ to the piston 44 will cause one or both of the springs 28, 30 to bias and move the plunger 38, the slide plate 50, and the piston 44 toward the cover 56 in the piston housing 40. As a result, the lever arm or fork may move to shift the SOWC 14 from the neutral mode 18 to the forward mode 16 or from the reverse mode 20 to the neutral mode 18.

While the best modes for carrying out the invention have been described in detail, those familiar with the art to which this invention relates will recognize various alternative designs and embodiments for practicing the invention within the scope of the appended claims.

The invention claimed is:

1. An actuator for shifting a selectable one-way clutch (SOWC) between a plurality of operating modes, said actuator comprising:
   a first spring configured for being compressed along a first axis;
   wherein said first spring has a preload compression along said first axis equivalent to a first start pressure;
   a second spring disposed adjacent said first spring along said first axis and configured for being compressed along said first axis;
   wherein said second spring has a preload compression along said first axis equivalent to a second start pressure;
   a plunger movably disposed adjacent said first spring along said first axis such that said first spring is disposed between said plunger and said second spring;
   a slide plate movably extending from said plunger and configured for operatively engaging the SOWC such that the SOWC shifts between the plurality of operating modes in response to movement of said slide plate;
   wherein said first spring is configured for being compressed from beyond said preload compression to a first stop position as a pressure applied to said actuator is increased from said first start pressure to a first stop pressure such that said first spring is prevented from further compression along said first axis;
   wherein said second spring is configured for being compressed from beyond said respective preload compression to a second stop position as said pressure applied to said actuator is increased from said second start pressure to a second stop pressure such that said second spring is prevented from further compression along said first axis.

2. An actuator, as set forth in claim 1, wherein said second start pressure is greater than said first stop pressure.

3. An actuator, as set forth in claim 1, further comprising a washer movably disposed between said first spring and said second spring;
   wherein said washer applies said preload compression to said second spring;
   wherein said plunger contacts said washer at said first stop position.

4. An actuator, as set forth in claim 3, further comprising:
   a spring housing defining a first bore extending along said first axis;
   wherein said first spring, said second spring, and said washer are disposed within said first bore; and
   a sleeve operatively extending into a portion of said first bore to bias said washer into compressing said second spring to said preload compression.

5. An actuator, as set forth in claim 4, wherein said spring housing at least partially surrounds said sleeve about said first axis.

6. An actuator, as set forth in claim 3, wherein said first pressure corresponding to said preload compression of said first spring is less than said third pressure corresponding to said preload compression of said second spring.

7. An actuator, as set forth in claim 6, wherein said first start pressure is equal to said preload compression of said first spring.

8. An actuator, as set forth in claim 6, wherein said first stop pressure is less than said preload compression of said second spring and said second start pressure is equal to said preload compression of said second spring.

9. An actuator, as set forth in claim 6, wherein said second stop pressure is equal to said second stop position of said second spring.

10. An actuator, as set forth in claim 1, further comprising:
    a piston housing defining a second bore therein;
    a piston disposed in said second bore and movable along a second axis in response to application of said pressure to said piston;
    wherein said piston is configured for operatively contacting said slide plate such that said slide plate moves in response to said piston moving along said second axis within said second bore.

11. An actuator, as set forth in claim 10, wherein said piston presents a piston face and a finger extends from said piston face along said second axis such that said finger is configured for operatively contacting said slide plate such that said slide plate moves in response to said piston moving along said second axis within said second bore.

12. An actuator, as set forth in claim 11, wherein said piston housing includes a collar that presents a bottom surface and at least partially surrounds said finger such that said piston face contacts said bottom surface to limit travel of said piston within said second bore at said second stop position.

13. An actuator, as set forth in claim 10, wherein said piston housing and said piston defines a pressure chamber configured for applying said pressure to said piston.

14. A method of operating an actuator configured to shift a selectable one-way clutch (SOWC) between a plurality of operating modes, said method comprising:
    providing a first spring and a second spring disposed adjacent the first spring along a first axis;
    providing a plunger disposed on the first axis such that the first spring is disposed between the plunger and the second spring;
    providing a slide plate operatively extending from the plunger and configured for operative connection to the SOWC;
    applying a first preload compression to the first spring along the first axis, wherein the first preload compression is equivalent to a first start pressure;
    applying a second preload compression to the second spring along the first axis, wherein the second preload compression is equivalent to a second start pressure;
    applying a pressure to the slide plate that is greater than the first start pressure such that the slide plate and the plunger move to further compress the first spring along the first axis from the preload compression;
    increasing the pressure applied to the slide plate from the first start pressure, corresponding to a first operating mode, to a first stop pressure such that the slide plate and the plunger move to further compress the first spring until a first stop position is reached, wherein the first stop position corresponds to a second operating mode of the SOWC;
    increasing the pressure applied to the slide plate from the first stop pressure to a second start pressure, wherein the slide plate and the plunger remain stationary to maintain the second operating mode of the SOWC;
    increasing the pressure applied to the slide plate from the second start pressure to a second stop pressure such that the slide plate and the plunger move to further compress the second spring from the preload compression until a second stop is reached, wherein the second stop position corresponds to a third operating mode of the SOWC.

15. A method, as set forth in claim 14, further comprising reducing the pressure applied to the slide plate such that at least one of the springs bias and move the slide plate and the plunger away from at least one of the stop positions to a different one of the operating modes of the SOWC.

16. A method, as set forth in claim 15, wherein reducing the pressure is further defined as reducing the pressure applied to the slide plate to 0 psi such that at least one of the springs bias and move the slide plate and the plunger such that the first operating mode is achieved.

17. A method, as set forth in claim 14, wherein the first start pressure is equal to said preload compression of said first spring.

18. A method, as set forth in claim 14, wherein said first stop pressure is less than said preload compression of said second spring and said second start pressure is equal to said preload compression of said second spring.

19. A method, as set forth in claim 14, wherein said second stop pressure is equal to said second stop position of said second spring.

20. A clutch assembly configured for shifting between a plurality of operating modes, said clutch assembly comprising:
    a selectable one-way clutch assembly (SOWC) movable between a first operating mode, a second operating mode, and a third operating mode; and
    an actuator configured to shift said SOWC between said operating modes, said actuator including:
    a spring housing defining a first bore therein;
    a first spring disposed in said first bore and configured for being compressed along a first axis;
    wherein said first spring has a preload compression along said first axis equivalent to a first start pressure;

a second spring disposed in said second bore, adjacent said second spring, and configured for being compressed along said first axis;

wherein said second spring has a preload compression along said first axis equivalent to a second start pressure;

a plunger movably disposed in said first bore along said first axis such that said first spring is disposed between said plunger and said second spring;

a slide plate movably extending from said plunger and configured operatively engaging said SOWC such that said SOWC shifts between said plurality of operating modes in response to movement of said plunger and said slide plate;

wherein said first spring is configured for being compressed from beyond said preload compression to a first stop position as said pressure is increased from said first start pressure to a first stop pressure such that said first spring is prevented from further compression along said first axis;

wherein said second spring is configured for being compressed from beyond said respective preload compression to a second stop position as said pressure is increased from said second start pressure to a second stop pressure such that said second spring is prevented from further compression along said first axis.

* * * * *